F. G. McCABE.
IRRIGATION PIPE.
APPLICATION FILED OCT. 6, 1909.
1,051,507.
Patented Jan. 28, 1913.
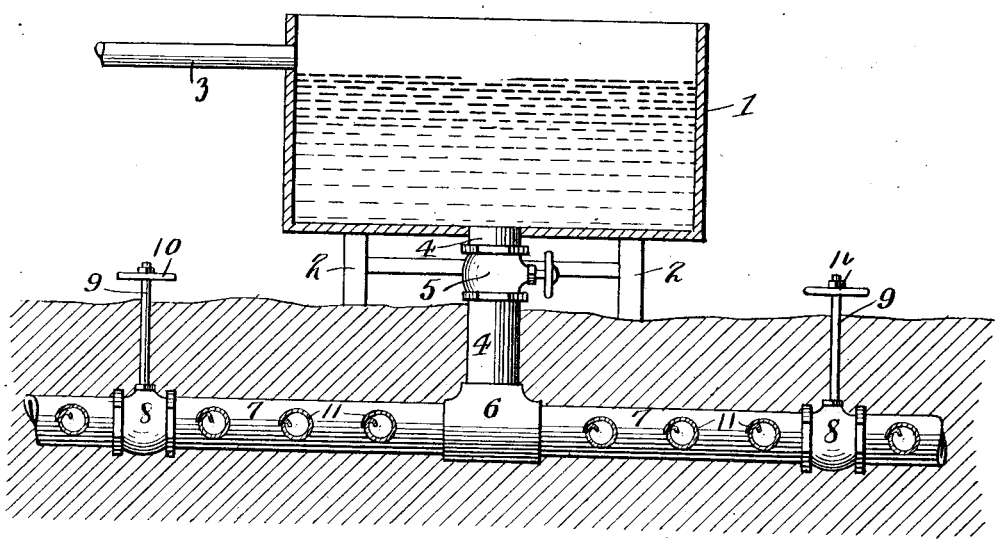
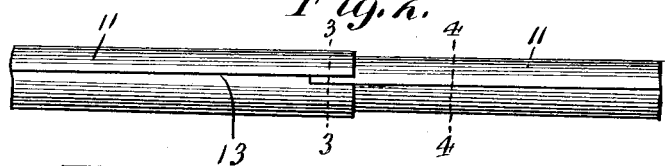
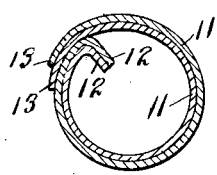
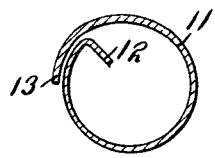
Inventor
Frank G. McCabe.

UNITED STATES PATENT OFFICE.

FRANK G. McCABE, OF MORIARTY, NEW MEXICO.

IRRIGATION-PIPE.

1,051,507.   Specification of Letters Patent.   Patented Jan. 28, 1913.

Application filed October 6, 1909.   Serial No. 521,238.

*To all whom it may concern:*

Be it known that I, FRANK G. MCCABE, a citizen of the United States of America, residing at Moriarty, in the county of Torrance and State of New Mexico, have invented new and useful Improvements in Irrigation-Pipes, of which the following is a specification.

This invention relates to irrigation pipes, and one of the principal objects of the same is to provide a simple and efficient pipe which can be readily formed of sheet metal and which can be readily coupled in lengths to suit all requirements.

Another object of the invention is to provide a pipe for irrigation purposes in which the lengths can be readily coupled without the use of a coupler, said lengths being fitted together and provided with an open seam to permit the water to overflow and pass out through said seam.

Still another object of the invention is to provide an irrigation pipe which can be quickly formed of sheet metal, which will not require perforating and in which the dirt will not fill up the passage for the water through said pipe.

These and other objects may be attained by means of the construction illustrated in the accompanying drawing, in which,—

Figure 1 is an elevation and partial section of an irrigation system showing the water tank in section and the irrigation pipes leading from the buried pipes also in section. Fig. 2 is a side elevation of two lengths of the irrigation pipe connected together in accordance with my invention. Fig. 3 is a sectional view on the line 3—3 of Fig. 2, shown on an enlarged scale. Fig. 4 is a sectional view on the line 4—4 of Fig. 2 made on an enlarged scale.

Referring to the drawing, the numeral 1 designates a water tank supported upon legs 2 resting upon the ground to be irrigated. A water supply pipe 3 communicates with the tank 1 near the top thereof. Communicating with the bottom of the tank is a surface pipe 4 having a suitable valve 5 therein, said surface pipe extending into the ground and provided with a T-coupling 6 for connecting the longitudinal pipe 7 thereto. The pipe 7 extends horizontally under the ground and is provided with suitable valves 8 operated by means of valve stems 9 extending through the ground and provided with hand wheels 10. The horizontal pipe 7 is provided with a series of openings in one side thereof, said openings being plain or unthreaded.

The irrigation pipes comprise a series of lengths 11 frictionally fitted together, said lengths each being composed of sheet metal and provided with an inwardly and angularly extending flange 12, the outer edge 13 of each length extending beyond the flange 12. One of the lengths 11 is inserted into each of the unthreaded openings in the buried pipe 7, and to couple a number of these lengths together it is only necessary to insert one end of one of the lengths into the end of the next adjoining length with the flanges 12 some distance apart and then rotate one of said lengths until the flanges come together, as shown in Fig. 3. When the pipes are thus connected the outer edge 13 of each length is slightly spaced apart from the body of the length to permit the water to seap through and irrigate the ground.

From the foregoing it will be obvious that the lengths 11 can be quickly made by first bending the flange 12 in the sheets and then bending the sheets into substantially circular form, as shown in section in Fig. 4, thus obviating the necessity of threading the main pipe, of threading the pipe ends, and of perforating the sheet metal. This is a material saving in the structure of these pipes, and at the same time a superior pipe is produced which can be quickly coupled in lengths and extended any desired distance.

I claim:—

An irrigation pipe comprising a plurality of pipe sections detachably connected together, each of said sections being formed from an oblong piece of sheet metal rolled upon itself into substantially circular form so that the side edge portions overlap one another, said overlapping portions being arranged in spaced relation with respect to each other, the side edge portion of the underlying side being bent to form an inwardly extending flange, one end of each of said sections being telescoped within one end of the adjacent section with their respective flanges in engagement with each other.

In testimony whereof I affix my signature in presence of two witnesses.

FRANK G. McCABE.

Witnesses:
W. L. WIMBERLY,
JAMES D. MANLEY.